United States Patent
Chang

(10) Patent No.: US 6,736,044 B2
(45) Date of Patent: May 18, 2004

(54) TABLE SAW HAVING A BLADE SUSPENSION STRUCTURE

(76) Inventor: Chin-Chin Chang, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 0 days.

(21) Appl. No.: 10/265,874

(22) Filed: Oct. 7, 2002

(65) Prior Publication Data

US 2004/0065181 A1 Apr. 8, 2004

(51) Int. Cl.$^7$ ............................................... B23D 19/00
(52) U.S. Cl. ...................................... 83/473; 83/477.2
(58) Field of Search .............................. 83/477.2, 473

(56) References Cited

U.S. PATENT DOCUMENTS

| | | | | |
|---|---|---|---|---|
| 1,527,587 A | * | 2/1925 | Hutchinson | 83/473 |
| 2,530,290 A | * | 11/1950 | Collins | 83/473 |
| 2,704,560 A | * | 3/1955 | Woessner | 83/473 |
| 2,711,762 A | * | 6/1955 | Gaskell | 83/473 |
| 3,011,529 A | * | 12/1961 | Copp | 83/473 |
| 3,340,908 A | * | 9/1967 | Crozier | 83/473 |
| 3,368,596 A | * | 2/1968 | Comer | 83/473 |
| 3,538,964 A | * | 11/1970 | Berends et al. | 83/473 |
| 3,905,263 A | * | 9/1975 | Smith | 83/477.2 |
| 4,184,394 A | * | 1/1980 | Gjerde | 83/477.2 |
| 4,270,427 A | * | 6/1981 | Colberg et al. | 83/473 |
| 4,599,927 A | * | 7/1986 | Eccardt et al. | 83/473 |
| 5,117,722 A | * | 6/1992 | Letendre | 83/473 |
| 5,842,400 A | * | 12/1998 | McIntosh | 83/477.2 |
| 5,875,698 A | * | 3/1999 | Ceroll et al. | 83/473 |
| 5,943,932 A | * | 8/1999 | Sberveglieri | 83/473 |
| 6,283,002 B1 | * | 9/2001 | Chiang | 83/477.2 |
| 6,502,493 B1 | * | 1/2003 | Eccardt et al. | 83/473 |
| 6,546,835 B2 | * | 4/2003 | Wang | 83/477.2 |

* cited by examiner

Primary Examiner—Allan N. Shoap
Assistant Examiner—Jason Prone
(74) Attorney, Agent, or Firm—Connolly Bove Lodge & Hutz LLP

(57) ABSTRACT

A table saw having a blade suspension structure includes a work table formed with a cutting slot for passage of a circular blade. A bent suspension rod is secured on the bottom of the work table, and is located adjacent to the cutting slot of the work table. The suspension rod having a distal end formed with a bent pivot shaft which is located adjacent to the circular blade and is in parallel with the circular blade, thereby apparently reducing a distance between the pivot shaft and the circular blade, and thereby reducing the swivel radius of the circular blade.

3 Claims, 5 Drawing Sheets

TABLE SAW HAVING A BLADE SUSPENSION STRUCTURE

BACKGROUND OF THE INVENTION

1. Field of the Invention

The present invention relates to a table saw having a blade suspension structure, and more particularly to a table saw having a blade suspension structure that may prevent the circular blade from protruding outward from the top face of the cutting slot of the work table during adjustment of the inclined cutting angle of the circular blade, so as to protect the user's safety.

2. Description of the Related Art

A conventional table saw in accordance with the prior art shown in FIGS. 1–4 comprises a work table 7 formed with a cutting slot for passage of a circular blade 6 that may be used to cut the workpiece. A suspension rod 1 is secured on the bottom of the work table 7. A swing seat 3 is pivotally mounted on the suspension rod 1. A rotation seat 4 is pivotally mounted on the swing seat 3. A motor gear box 5 is secured on the rotation seat 4 to pivot therewith. The circular blade 6 is rotatably mounted on the motor gear box 5, and is extended through the cutting slot of the work table 7. A threaded rod 2 is rotatably mounted on the swing seat 3, and has one end rested on the rotation seat 4 for pushing the rotation seat 4.

In operation, the threaded rod 2 may be rotated and moved on the swing seat 3 to push the rotation seat 4 to pivot, so that the motor gear box 5 and the circular blade 6 may be moved by pivot of the rotation seat 4, and the circular blade 6 may be protruded outward from the cutting slot of the work table 7, and thereby adjusting the cutting height of the circular blade 6. In addition, before adjustment of the cutting height of the circular blade 6, the swing seat 3 and the circular blade 6 may be pivoted about the suspension rod 1 to move from the position as shown in FIG. 2 to the position as shown in FIG. 3, thereby adjusting the inclined cutting angle of the circular blade 6. However, the distance "a" between the circular blade 6 and the suspension rod 1 is too large, so that when the swing seat 3 and the circular blade 6 are pivoted about the suspension rod 1 to move to the position as shown in FIG. 3 where the circular blade 6 has an inclined angle of 45 degrees, the top edge of the circular blade 6 is at the greatest height and will protrude outward from the top face of the cutting slot of the work table 7 through a height of "b" as shown in FIG. 3. Thus, the top edge of the circular blade 6 will protrude outward from the top face of the cutting slot of the work table 7 through a height of "b" before adjustment of the cutting height of the circular blade 6, thereby easily causing danger to the user or injuring the user.

In addition, when the threaded rod 2 is rotated and moved on the swing seat 3 to push the rotation seat 4 to pivot, the motor gear box 5 and the circular blade 6 may be moved by pivot of the rotation seat 4 to the position as shown in FIG. 4. However, the distance "a" between the circular blade 6 and the suspension rod 1 is too large, so that the propeller shaft 9 of the circular blade 6 easily hits the bottom face of the work table 7, thereby affecting operation of the conventional table saw.

SUMMARY OF THE INVENTION

The present invention has arisen to mitigate and/or obviate the disadvantage of the conventional table saw.

The primary objective of the present invention is to provide a table saw having a blade suspension structure, wherein the distance between the shaft center of the pivot shaft of the suspension rod and the circular blade may be reduced, so as to reduce the swivel radius of the circular blade during adjustment of the inclined cutting angle of the circular blade, thereby preventing the circular blade from protruding outward from the top face of the cutting slot of the work table during adjustment of the inclined cutting angle of the circular blade, so as to protect the user's safety.

In accordance with the present invention, there is provided a table saw having a blade suspension structure, comprising:

a work table formed with an elongated cutting slot for passage of a circular blade;

a bent suspension rod secured on a bottom of the work table, and located adjacent to the cutting slot of the work table, the suspension rod having a distal end formed with a bent pivot shaft;

wherein, the bent pivot shaft at the distal end of the suspension rod is located adjacent to the circular blade and is in parallel with the circular blade, thereby apparently reducing a distance between the pivot shaft and the circular blade.

Further benefits and advantages of the present invention will become apparent after a careful reading of the detailed description with appropriate reference to the accompanying drawings.

DETAILED DESCRIPTION OF THE INVENTION

Figure 1:
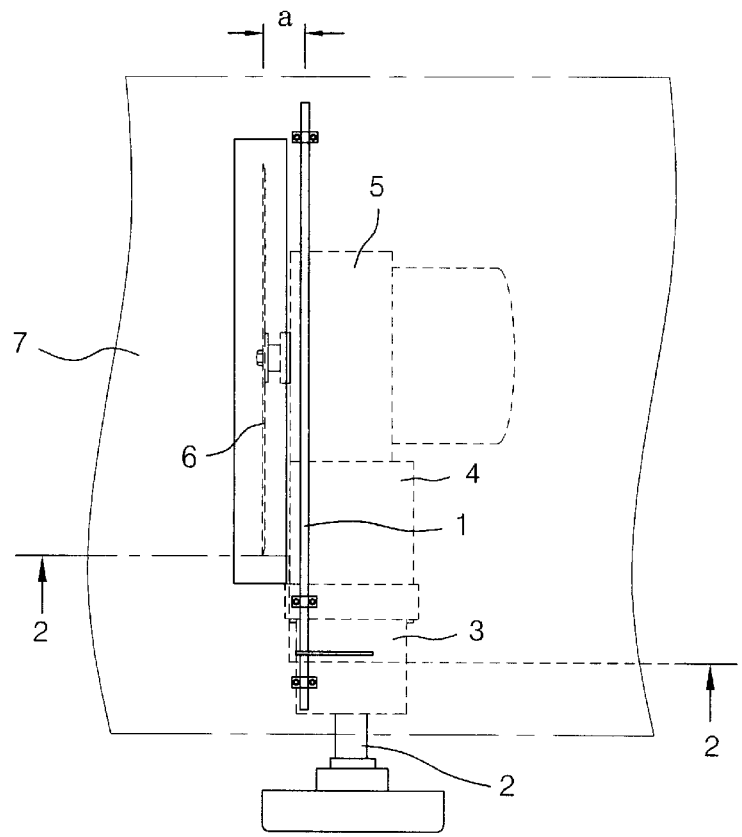
FIG. 1 is a top plan view of a conventional table saw in accordance with the prior art.
Figure 2:
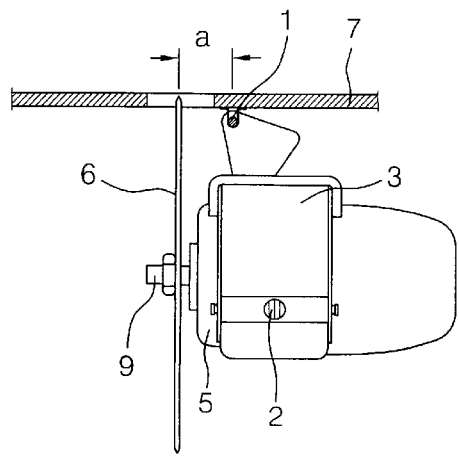
FIG. 2 is a cross-sectional view of the conventional table saw taken along line 2—2 as shown in FIG. 1.
Figure 3:
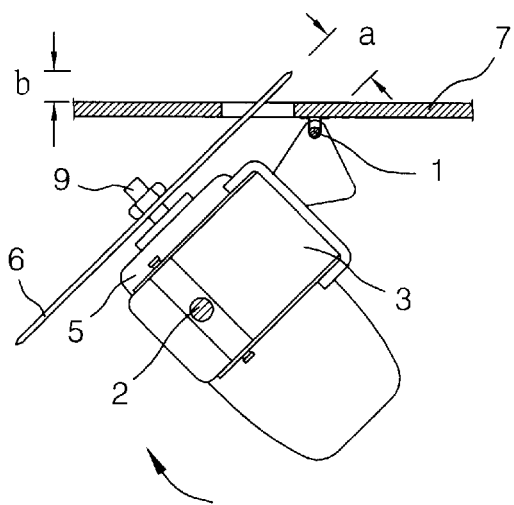
FIG. 3 is a schematic operational view of the conventional table saw as shown in FIG. 2.
Figure 4:
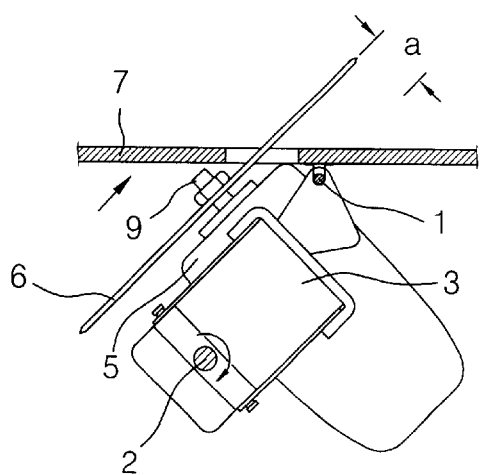
FIG. 4 is a schematic operational view of the conventional table saw as shown in FIG. 3 in adjustment.
Figure 5:
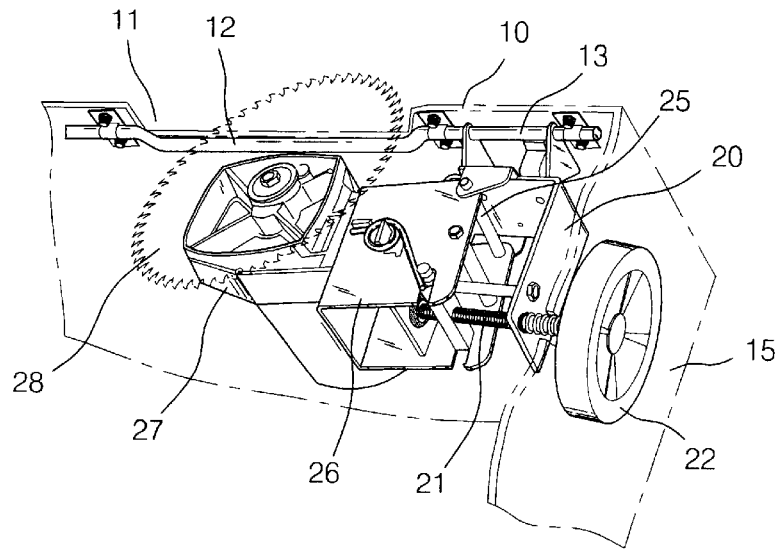
FIG. 5 is perspective view of a table saw having a blade suspension structure in accordance with a preferred embodiment of the present invention.
Figure 6:
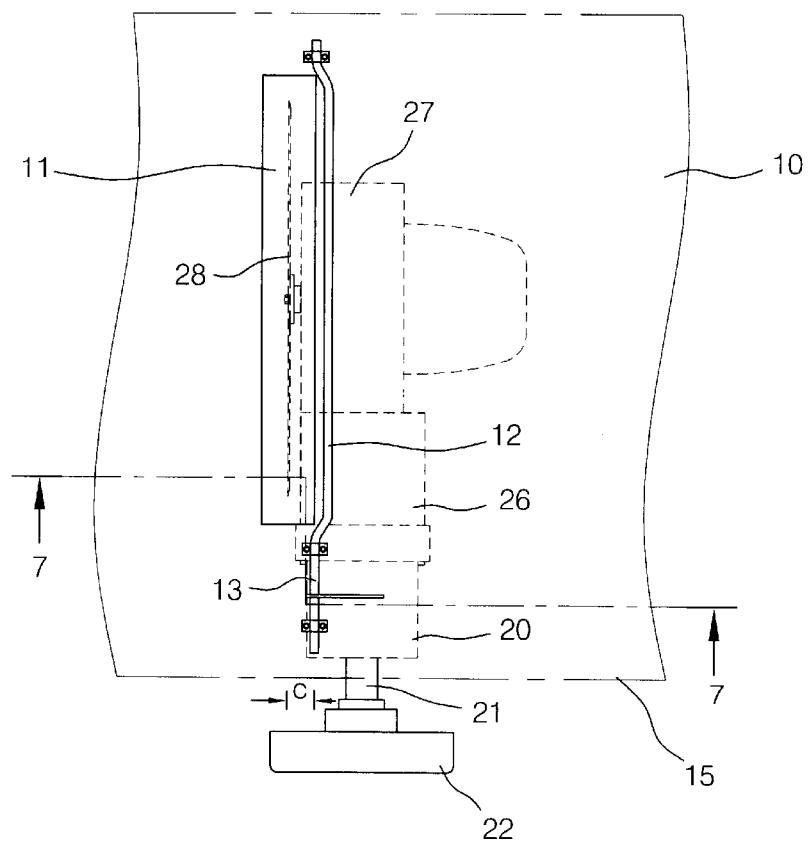
FIG. 6 is a top plan view of the table saw having a blade suspension structure as shown in FIG. 3.
Figure 7:
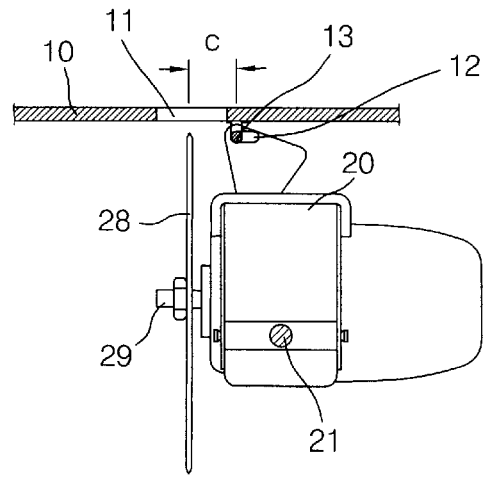
FIG. 7 is a cross-sectional view of the table saw having a blade suspension structure taken along line 7—7 as shown in FIG. 6.

Referring to the drawings and initially to FIGS. 5–7, a table saw having a blade suspension structure in accordance with a preferred embodiment of the present invention comprises a work table 10 having a central position formed with an elongated cutting slot 11 for passage of a circular blade 28 that may be used to cut the workpiece. The work table 10 has a front side formed with a front panel 15.

A bent suspension rod 12 is secured on a bottom of the work table 10, and is located adjacent to the cutting slot 11. The bent suspension rod 12 is substantially U-shaped, and has a distal end formed with a pivot shaft 13.

A swing seat 20 is pivotally mounted on the pivot shaft 13 of the bent suspension rod 12, and may be pivoted about the pivot shaft 13 of the bent suspension rod 12 in parallel with the front panel 15 of the work table 10.

A transverse pivot shaft 25 is secured in the swing seat 20. A rotation seat 26 is pivotally mounted on the transverse pivot shaft 25 of the swing seat 20. A motor gear box 27 is secured on a first side of the rotation seat 26 to pivot therewith. The circular blade 28 is rotatably mounted on the motor gear box 27, and is extended through the cutting slot 11 of the work table 10.

A threaded rod 21 is extended through one side of the swing seat 20, and has a first end rested on a second side of the rotation seat 26 for pushing the rotation seat 26, and a second end extended outward from the front panel 15 of the work table 10. A hand wheel 22 is secured on the second end of the threaded rod 21 for rotating and moving the threaded rod 21.

Thus, the hand wheel 22 may be rotated to rotate the threaded rod 21 which may be moved forward to push the rotation seat 26 to pivot about the transverse pivot shaft 25 of the swing seat 20, so that the motor gear box 27 and the circular blade 28 may be moved by pivot of the rotation seat 26, thereby adjusting the pivot position of the rotation seat 26, the motor gear box 27 and the circular blade 28, and thereby adjusting the cutting height of the circular blade 28.

The main feature of the present invention is described as follows.

The bent suspension rod 12 is secured on the bottom of the work table 10, and is located adjacent to the cutting slot 11 of the work table 10. The bent pivot shaft 13 at the front side of the suspension rod 12 is located adjacent to the circular blade 28 and is located in parallel with the circular blade 28, thereby apparently reducing the distance "C" between the pivot shaft 13 and the circular blade 28, and thereby greatly reducing the swivel radius of the circular blade 28.

Figure 8:
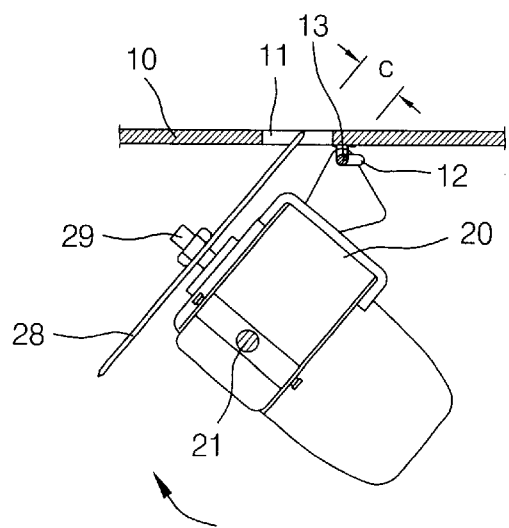
FIG. 8 is a schematic operational view of the table saw having a blade suspension structure as shown in FIG. 7.

In adjustment, the swing seat 20 and the circular blade 28 may be pivoted about the pivot shaft 13 of the suspension rod 12 to move from the position as shown in FIG. 7 to the position as shown in FIG. 8, thereby adjusting the inclined cutting angle of the circular blade 28. Thus, when the swing seat 20 and the circular blade 28 are pivoted about the pivot shaft 13 of the suspension rod 12 to move from the position as shown in FIG. 7 to the position as shown in FIG. 8 where the circular blade 28 has an inclined angle of 45 degrees, the top edge of the circular blade 28 is at the greatest height and will not protrude outward from the top face of the cutting slot 11 of the work table 10. Accordingly, by reducing the distance "C" between the shaft center of the pivot shaft 13 of the suspension rod 12 and the circular blade 28 as shown in FIG. 7, even when the top edge of the circular blade 28 is at the greatest height a as shown in FIG. 8, the top edge of the circular blade 28 will not protrude outward from the top face of the cutting slot 11 of the work table 10, thereby preventing the circular blade 28 from protruding outward from the top face of the cutting slot 11 of the work table 10 to injure the user, so as to protect the user's safety.

Figure 9:
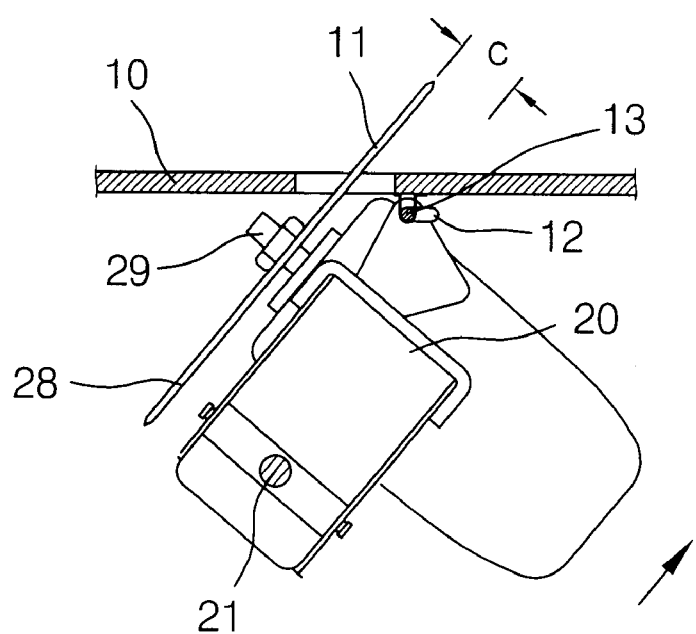
FIG. 9 is a schematic operational view of the table saw having a blade suspension structure as shown in FIG. 8 in adjustment.

After the inclined cutting angle of the circular blade 28 has been adjusted and fixed, the hand wheel 22 may be rotated to rotate the threaded rod 21 which may be moved forward to push the rotation seat 26 to pivot about the transverse pivot shaft 25 of the swing seat 20, so that the motor gear box 27 and the circular blade 28 may be moved by pivot of the rotation seat 26, and the circular blade 28 may be moved from the position as shown in FIG. 8 to the position as shown in FIG. 9 to protrude outward from the cutting slot 11 of the work table 10, thereby adjusting the cutting height of the circular blade 28. In such a manner, the propeller shaft 29 of the circular blade 28 will not hit the bottom of the work table 10, thereby preventing from affecting operation of the table saw.

Accordingly, the distance "C" between the shaft center of the pivot shaft 13 of the suspension rod 12 and the circular blade 28 may be reduced, so as to reduce the swivel radius of the circular blade 28 during adjustment of the inclined cutting angle of the circular blade 28, thereby preventing the circular blade 28 from protruding outward from the top face of the cutting slot 11 of the work table 10 during adjustment of the inclined cutting angle of the circular blade 28, so as to protect the user's safety.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A table saw having a blade suspension structure, comprising:

a work table formed with an elongated cutting slot for passage of a circular blade;

a bent suspension rod being substantially U-shaped and secured on a bottom of the work table, and located adjacent to the cutting slot of the work table, the suspension rod having a distal end formed with a bent pivot shaft;

a swing seat pivotally mounted on the pivot shaft of the bent suspension rod, the swing seat being pivoted about the pivot shaft of the bent suspension rod in parallel with a front panel of the work table for adjusting a work angle of the circular blade;

a rotation seat pivotally mounted on the swing seat; and a motor gear box secured on a first side of the rotation seat to pivot therewith, wherein the circular blade is rotatably mounted on the motor gear box and extends through the cutting slot of the work table so that the rotation seat is provided to adjust a work height of the circular blade;

wherein, the bent pivot shaft at the distal end of the suspension rod is located adjacent to the circular blade and is in parallel with the circular blade, thereby apparently reducing a distance between the pivot shaft and the circular blade.

2. The table saw having a blade suspension structure in accordance with claim 1, further comprising a threaded rod extended through one side of the swing seat and having a first end rested on a second side of the rotation seat for pushing the rotation seat, and a second end-extended outward from-a front panel of the work table, and hand wheel secured on the second end of the threaded rod for rotating and moving the threaded rod.

3. The table saw having a blade suspension structure in accordance with claim 1, further comprising a transverse pivot shaft secured in the swing seat, wherein the rotation seat is pivotally mounted on the transverse pivot shaft of the swing seat.

* * * * *